(12) United States Patent
Barrou et al.

(10) Patent No.: US 9,456,184 B2
(45) Date of Patent: Sep. 27, 2016

(54) AIRCRAFT FUSELAGE INCLUDING A WINDOW EQUIPPED WITH A SYSTEM FOR DISPLAYING IMAGES OF THE OUTSIDE ENVIRONMENT

(71) Applicant: AIRBUS SAS, Blagnac (FR)

(72) Inventors: Laurent Barrou, Castelnau d'Estretefonds (FR); Brice Giannelli, L'Isles Jourdain (FR)

(73) Assignee: AIRBUS S.A.S., Blagnac (FR)

( * ) Notice: Subject to any disclaimer, the term of this patent is extended or adjusted under 35 U.S.C. 154(b) by 277 days.

(21) Appl. No.: 14/097,382

(22) Filed: Dec. 5, 2013

(65) Prior Publication Data
US 2014/0160285 A1 Jun. 12, 2014

(30) Foreign Application Priority Data
Dec. 6, 2012 (FR) .............................. 2012 0061736

(51) Int. Cl.
*H04N 7/18* (2006.01)
*B60R 21/015* (2006.01)
*B64D 11/00* (2006.01)

(52) U.S. Cl.
CPC ........... *H04N 7/183* (2013.01); *B64D 11/0015* (2013.01); *B64D 2011/0061* (2013.01)

(58) Field of Classification Search
CPC .................................................... H04N 7/183
See application file for complete search history.

(56) References Cited

U.S. PATENT DOCUMENTS

| 5,253,051 A | 10/1993 | McManigal |
| 2007/0085907 A1* | 4/2007 | Beauregard ............ G07C 5/085 348/144 |
| 2010/0188506 A1 | 7/2010 | Dwyer et al. |
| 2010/0292886 A1* | 11/2010 | Szczerba ............... G01C 21/365 701/31.4 |
| 2012/0068006 A1* | 3/2012 | Jones .................... B64C 27/025 244/17.15 |
| 2012/0256945 A1* | 10/2012 | Kidron ................... A63G 31/16 345/619 |

FOREIGN PATENT DOCUMENTS

WO          2010004547          1/2010

OTHER PUBLICATIONS

French Search Report, Jul. 24, 2013.

\* cited by examiner

*Primary Examiner* — Dave Czekaj
*Assistant Examiner* — Alison Slater
(74) *Attorney, Agent, or Firm* — Greer, Burns & Crain, Ltd.

(57) ABSTRACT

An aircraft fuselage comprising at least one window equipped with a system for displaying images of the outside environment for a passenger. The display system comprises a camera for filming the environment outside the aircraft; a display surface; a display projector suitable for displaying an image of the outside environment on the display surface; and a first image processor suitable for receiving the images of the outside environment. The first image processor is configured to produce computed images which are in continuity with the images visible to the passenger through the window, and transmit the computed images to the display projector.

13 Claims, 4 Drawing Sheets

AIRCRAFT FUSELAGE INCLUDING A WINDOW EQUIPPED WITH A SYSTEM FOR DISPLAYING IMAGES OF THE OUTSIDE ENVIRONMENT

CROSS-REFERENCES TO RELATED APPLICATIONS

This application claims the benefit of the French patent application No. 20120061736 filed on Dec. 6, 2012, the entire disclosures of which are incorporated herein by way of reference.

BACKGROUND OF THE INVENTION

The present invention relates to a system for displaying images of the environment outside an aircraft.

The fuselages of aircraft are conventionally equipped with windows which enable the passengers to view a part of the environment outside the aircraft. The visibility of the passengers over the outside environment is limited to the dimensions of the aircraft windows.

The document FR2854374 proposes augmenting visibility by replacing all or some of the windows of the aeroplane with display systems, also called virtual windows, on which are displayed, to the passengers, realistic images of the landscape that they would be able to see through a real window. The displayed images originate from a pre-recorded image base and are supplied according to the position of the aeroplane so as to correspond to the terrain being flow over.

One of the drawbacks of such a display system is the need to modify the structure of the aircraft and of not displaying the reality of the outside environment.

One of the objectives of the present invention is to remedy all or part of the prior art drawbacks mentioned above.

SUMMARY OF THE INVENTION

The invention proposes, to this end, an aircraft fuselage comprising at least one cabin, furnished to accommodate at least one passenger, the cabin comprising at least one window. The fuselage comprises, for the at least one window, a system for displaying images of the outside environment comprising:
  means for acquiring images of the environment outside the aircraft;
  at least one display surface;
  display means suitable for displaying an image on the display surface; and
  first image processing means suitable for receiving the images of the outside environment;
  these first image processing means being configured to:
  produce computed images which are in continuity with the images visible to the passenger through the window; and
  transmit the computed images to the display means.

Thus, the display system according to the invention makes it possible to widen the outside visibility for the passenger, by displaying images of the outside environment around the window.

Advantageously, the display surface can be a movable surface that can be adapted to the head of the passenger.

Alternatively, the display surface is situated around the window.

Preferably, the cabin of the aircraft fuselage according to the invention comprises means for detecting the position of the passenger located in the cabin.

Thus, the display system according to the invention adapts to the movements of the passenger in the cabin.

Preferably, the means for detecting the position of the passenger located in the cabin comprise at least two cameras associated with second image processing means.

According to one embodiment of the invention, the display means comprise at least one screen built into the walls of the cabin, said at least one screen forming at least a part of the display surface. According to another embodiment of the invention, the display means are projection means located in the cabin and suitable for projecting the computed images onto the display surface. Preferably, the display means incorporate an image distortion correction system configured to adapt the computed images to the topography of the display surface.

Preferably, the means for acquiring images of the environment outside the fuselage according to the invention comprise at least one video camera.

According to a first variant, the means for acquiring images of the outside environment comprise at least one video camera positioned on the outside of the fuselage, on a lateral part of the fuselage.

According to a second variant, the means for acquiring images of the outside environment comprise at least two video cameras positioned on the outside of the fuselage, one on an upper part of fuselage and the other on a lower part of the fuselage.

Advantageously, the means for acquiring images of the outside environment comprise a set of video cameras configured to acquire images of the outside environment corresponding to a majority of the field of view that the passenger present in the cabin could have in the absence of the walls of said cabin.

BRIEF DESCRIPTION OF THE DRAWINGS

Other features and advantages of the invention will become apparent on reading embodiments of the invention given with reference to the appended figures in which.

DETAILED DESCRIPTION OF THE PREFERRED EMBODIMENTS

Figure 1:
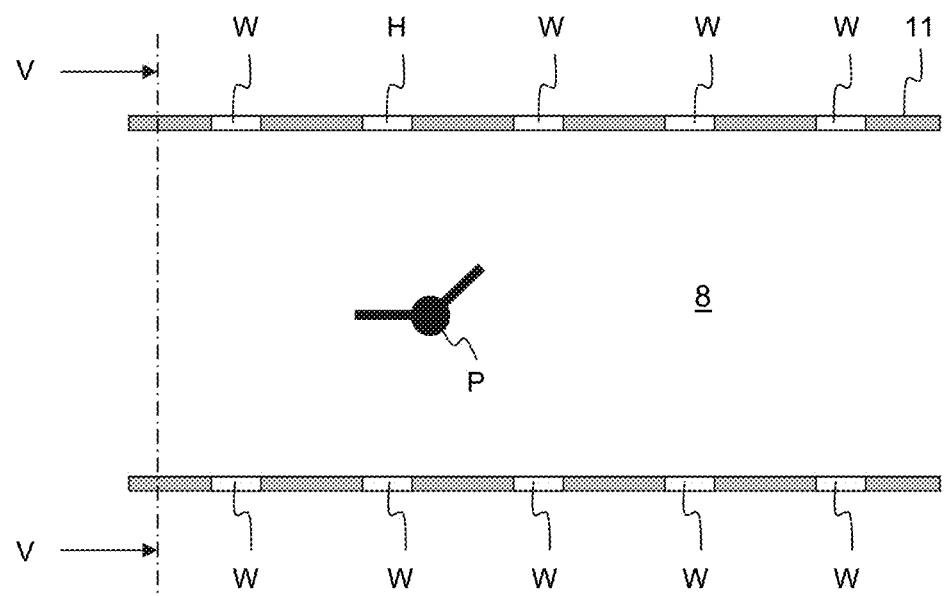
FIG. 1 schematically illustrates a portion of a cabin of a fuselage of an aircraft for at least one passenger.

FIG. 1 shows a portion of fuselage 11 of an aircraft. Conventionally, the fuselage 11 comprises a cabin 8, furnished to accommodate passengers, and a plurality of windows W, H, arranged along the fuselage 11 enabling the passengers to view the environment outside the aircraft.

Figure 2:
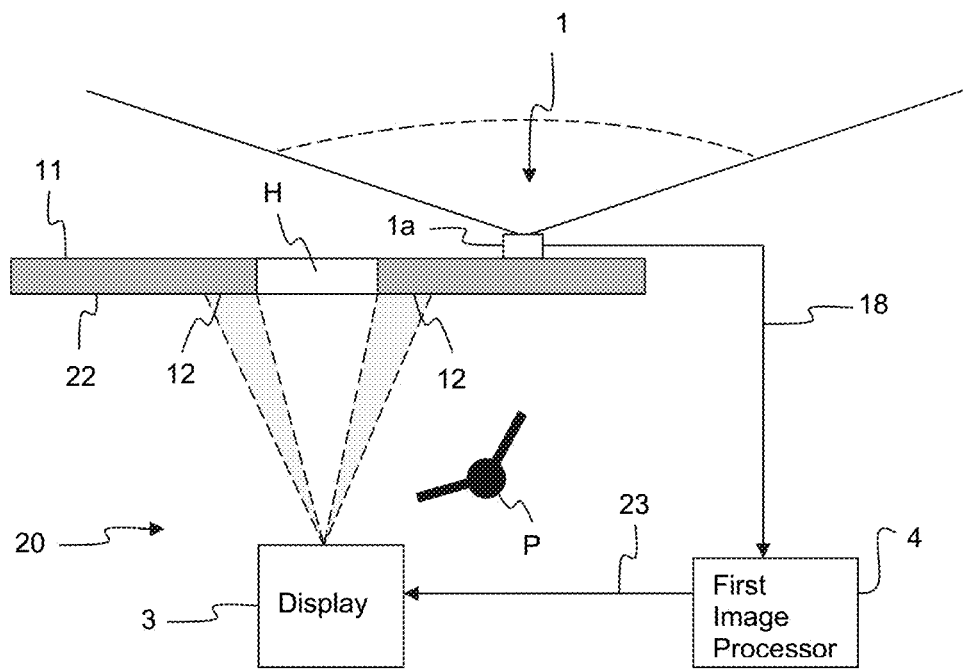
FIG. 2 schematically illustrates a cabin of an aircraft equipped with a system for displaying images of the outside environment according to the present invention.

As represented in FIG. 2, the cabin is equipped with a display system 20 according to the invention. This display system 20 is associated with the window H. This display system 20 comprises image acquisition means 1 connected via a link 18 to first image processing means 4. It also comprises display means 3 connected via a link 23 to the first image processing means 4.

Figure 3:
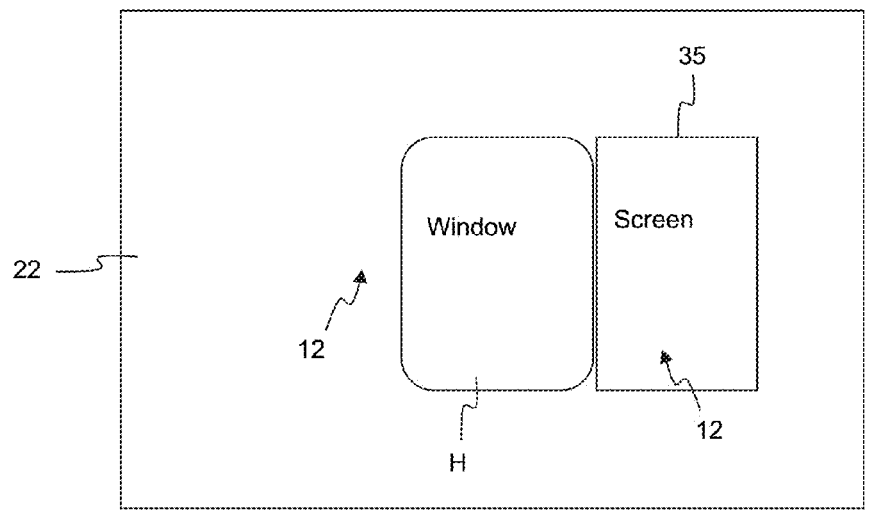
FIG. 3 schematically illustrates, by front view, a portion of a wall of the cabin of FIG. 2.

In the embodiment represented, the display means 3 comprise a projector fixed to the ceiling of the cabin 8, arranged in such a way as to project an image onto a display surface 12, represented in FIG. 3, built into a side wall 22 of the cabin 8, adjacent to the fuselage 11.

The image acquisition means 1 comprise a video camera 1a. The video camera 1a is, for example, built into a lateral part of the outside fuselage 11 of the aircraft.

In operation, images of the outside environment of the aircraft are acquired by the image acquisitions means 1 and transmitted via the link 18 to the first image processing means 4. These first image processing means 4 produce, from the images of the outside environment of the aircraft, computed images representing the outside environment of the aircraft. These computed images are in continuity with the images that can be seen through the window H by a passenger P situated at a determined position in the cabin 8 of the fuselage. The computed images are transmitted via the link 23 to the display means 3 by virtue of which they are projected onto the display surface 12 of the cabin 8.

Thus, the display system 20 according to the invention makes it possible to widen the outside visibility by the projection of the images of the outside environment around the window H for the passenger P.

Figure 4:
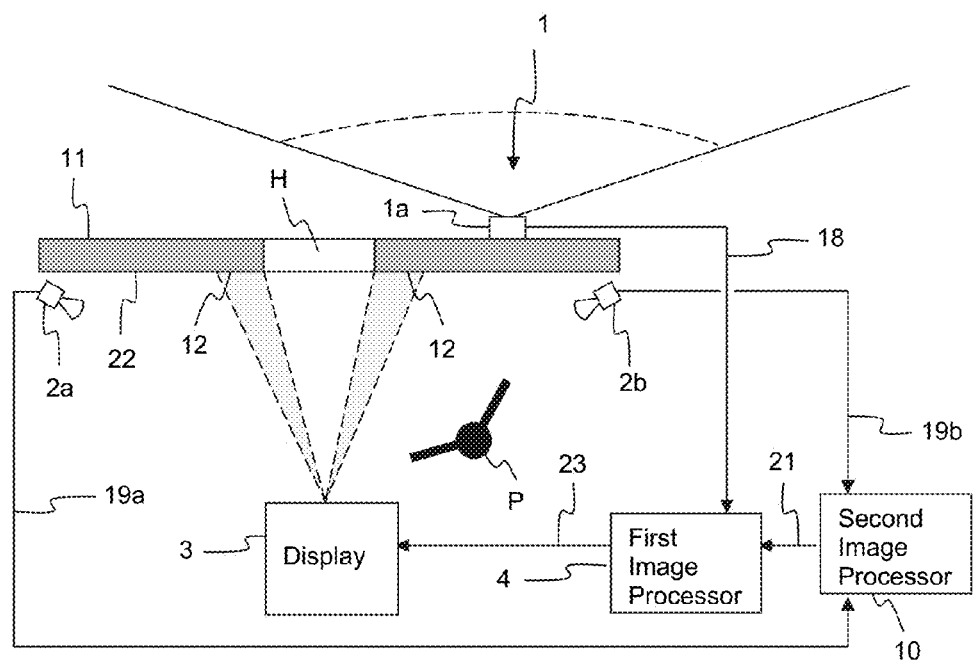
FIG. 4 illustrates a view similar to FIG. 2 of a cabin of an aircraft equipped with a system for displaying images of the outside environment according to a variant embodiment of the invention.

Preferentially, as represented in FIG. 4, the cabin 8 is equipped with means for detecting the position of a passenger P. These means comprise, for example, two cameras 2a and 2b associated with second image processing means 10. The cameras 2a and 2b are arranged in the cabin 8 so as to follow the movements of the head of the passenger P. The cameras 2a and 2b are linked via links 19a and 19b to the second image processing means 10 connected by a link 21 to the first image processing means 4.

In operation, images of the head of the passenger P are acquired by the cameras 2a and 2b. The second image processing means 10 perform image processing operations on the images acquired by the cameras 2a and 2b in order to determine the position X of the head of the passenger, for example by mapping between the acquired images and a 3D head model. The second image processing means 10 transmit the value X of the position of the head of the passenger P via the link 21 to the first image processing means 4.

The first image processing means 4 comprise a first image processor including electrical circuitry and software, the image processor produces, from the images of the outside environment of the aircraft, from the value X and from the position of the display surface 12, computed images representing the outside environment of the aircraft in continuity with the real images seen by the passenger P through the window H.

The display means 3 incorporate an image distortion correction system configured to adapt the computed images to the topography of the display surface 12. This distortion correction can, for example, be performed by software.

Thus, the images displayed on the display surface 12 by the display means 3 are not deformed by the topography of said display surface 12.

Advantageously, such a display system makes it possible to display images of the outside environment of the aircraft and adapt them according to the gaze of the passenger P, for example when looking at the terrain being flown over through the bottom of the window in the landing phase or when looking at the horizon through the window in the cruising phase, and according to the relief of the display surface, for example the relief of the area framing the window which is generally convex. Thus, the displayed images are in continuity with the images of the outside of the aircraft that can be seen by the passenger P through the window H, notably when the passenger P looks downwards or to one of the sides of the window H.

Figure 5:
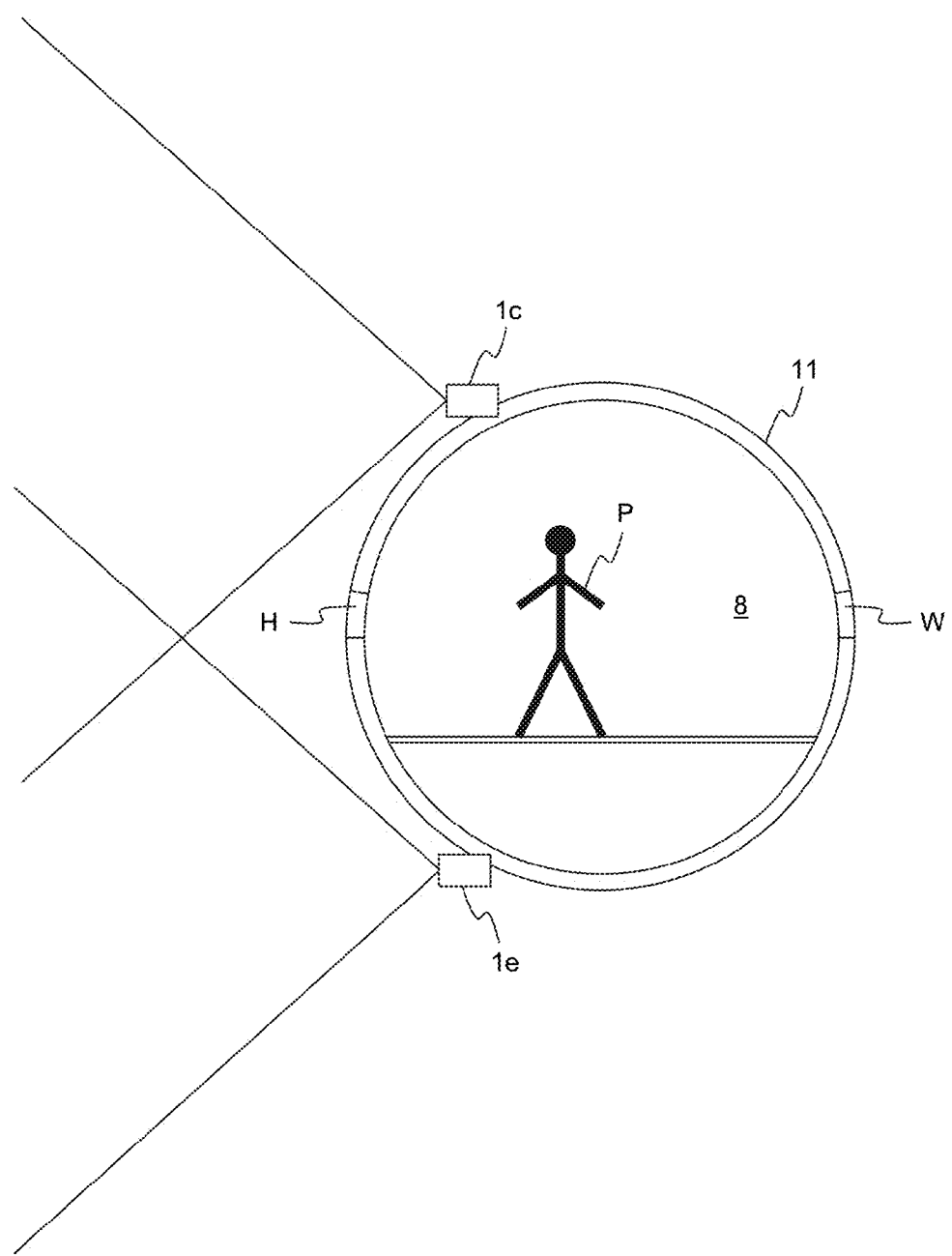
FIG. 5 is a cross-sectional view along the axis V-V of the fuselage of the aircraft of FIG. 1 illustrating a positioning of the image acquisition means.

Obviously, the present invention is not limited to the embodiments described above and can be extended to any variant that conforms to its spirit. Thus, as represented in FIG. 5, the acquisition means 1 can comprise two video cameras 1c and 1e situated on the perimeter of the fuselage 11, such that the video camera 1c is arranged on the upper part of the fuselage 11 of the aircraft and the video camera 1e is arranged on the lower part of the fuselage 11. Preferentially, the video cameras 1c and 1e are built into the fuselage 11 of the aircraft.

In operation, the video cameras acquire images of the outside environment corresponding to a majority of the field of view that the passenger P could have in the absence of the walls of the fuselage 11.

Also, the images computed by the image processing tools 4 can be displayed by the display means 3 on at least one screen 35 built into at least one of the sides of the window H on the wall 22 of the cabin 8, as represented in FIG. 3. In this case, said at least one screen 35 forms at least a part of the display surface 12.

Moreover, the above description has been given on the basis of a single equipped window. In a variant that is not represented, each of the windows or a plurality of windows of the cabin 8, is equipped with a display system according to the invention.

The passenger P can notably be a priority passenger to whom said display system is dedicated. It can be, for example, a passenger travelling on board a private aircraft or else a passenger travelling in a reserved space on board a commercial aircraft.

Figure 6:
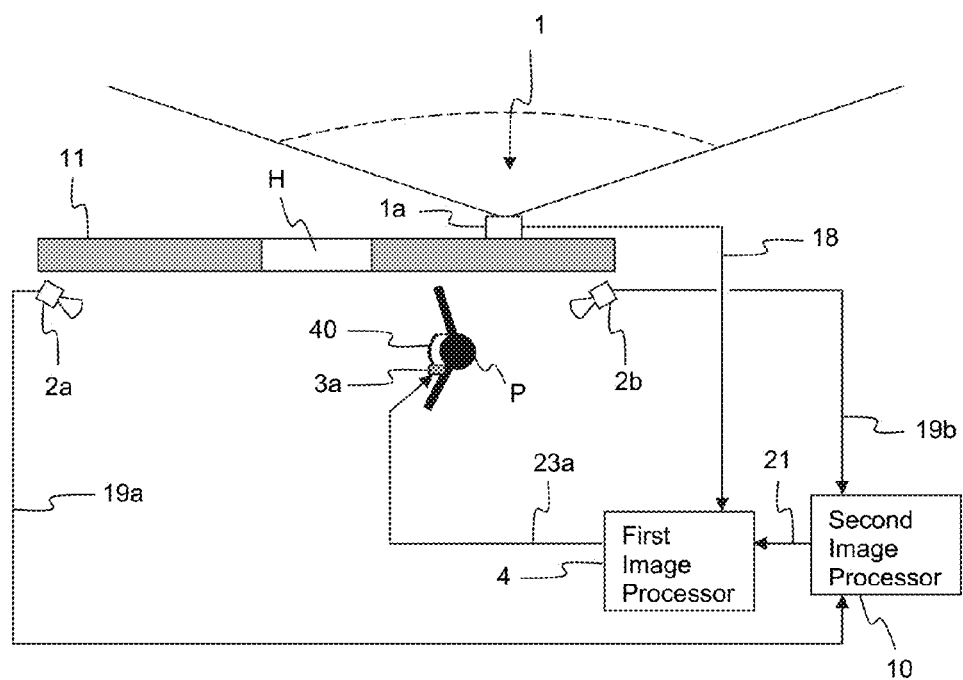
FIG. 6 schematically illustrates another variant embodiment of the invention.

According to a variant of the invention, the display surface is a movable surface that can be adapted to the head of the passenger P. This movable surface can notably correspond to spectacles 40 that the passenger can wear, as represented in FIG. 6. The spectacles 40 can be spectacles with head-up display, video spectacles or any other type of spectacles that make it possible to display images. Preferably, these spectacles also enable the passenger to view his or her environment by transparency. However, this variant of the invention is not limited to such spectacles: the movable surface can also correspond to a surface of a headset likely to be worn by the passenger, or to any other display device likely to be worn by the passenger in front of his or her eyes. This variant of the invention can be applied to any passenger of the aircraft, even a non-priority passenger. According to this variant of the invention, the display system comprises means for detecting the position of the passenger P, such as those already described: cameras 2a and 2b, second image processing means 10, etc. The second image processing means also comprise electrical circuitry and software to process the images acquired by the cameras. In addition to the position X of the passenger, the second image processing means 10 then also compute the direction Y of the gaze of the passenger, from images supplied by the cameras 2a and 2b. For this, they can, for example, use a 3D head model as well as an algorithm for morphologically analysing the face of the passenger P, making it possible to detect the position of the eyes of the passenger. The second image processing means 10 transmit the values X and Y of the position and of the direction of the gaze of the passenger P to the first image processing means 4. The latter produce images computed by taking into account both the position and the direction of the gaze of the passenger P. It is in fact advantageous for the computed images to be a function of the direction of the gaze of the passenger because the display surface, for example the spectacles 40, can move with the head of the passenger. The first image processing means 4 transmit these images via a link 23a to display means 3a associated with the spectacles 40. Preferably, the display means 3a are incorporated in the spectacles 40 and the link 23a is a wireless link, for example of wife or Bluetooth type. Thus, the passenger can watch the environment outside the aircraft through the window H, through the spectacles 40, while viewing, on the spectacles 40, said computed images which are in continuity with the images visible through the window. A system according to this variant of the invention can advantageously be used by each of the passengers of a commercial aircraft. In such a case, the cameras 2a and 2b, the second image processing means 10 and the first image processing means 4 can be common to a group of passengers, the first image processing means 4 then computing images for each of the passengers of the group concerned.

A display system according to the invention can operate according to two modes of use. In a first mode, the means for detecting the position of a passenger located in the cabin are activated in order to widen the visibility of the passenger P on the landscape being flown over. This mode can be used for example during a take-off phase or during a landing phase. In a second mode of use, for example during a cruising phase in which the landscape is more constant, the means for detecting the position of a passenger located in the cabin are deactivated.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft fuselage of an aircraft, comprising at least one cabin, configured to accommodate at least one passenger, the cabin comprising at least one window, the aircraft fuselage also comprising, for the at least one window, a system for displaying an image of an outside environment of the aircraft, comprising:
   an image acquiring device of the outside environment of the aircraft;
   at least one display surface;
   a display device configured for displaying the image of the outside environment on the display surface;
   a first image processor configured for receiving the image of the outside environment;
   wherein the first image processor is configured to:
   produce a computed image which is in continuity with the image of the outside environment visible to the passenger through the window, and
   transmit the computed image to the display device; and
   a second image processor configured for determining a position of a head of the passenger and a direction of a gaze of the passenger,
   wherein the second image processor transmits values of the position of the head of the passenger and the direction of the gaze of the passenger to the first image processor, such that the computed image is generated based on the position of the head and the direction of the gaze of the passenger, and
   wherein the system is operated in two different modes, a first mode in which the determination of the position of the head of the passenger and the direction of the gaze of the passenger is activated during at least one of a takeoff phase and a landing phase of the aircraft and a second mode in which the determination of the position of the head of the passenger and the direction of the gaze of the passenger is deactivated during a cruising phase of the aircraft.

2. The aircraft fuselage according to claim 1, wherein the display surface is a movable surface that is adapted to movement of the head of the passenger.

3. The aircraft fuselage according to claim 1, wherein the display surface is disposed adjacent to the window.

4. The aircraft fuselage according to claim 2, wherein the cabin further comprises a position detector configured for detecting the position of the passenger located in the cabin.

5. The aircraft fuselage according to claim 4, wherein the position detector includes at least two cameras associated with the second image processor.

6. The aircraft fuselage according to claim 3, wherein the display device includes at least one screen built into a wall of the cabin, said at least one screen forming at least a part of the display surface.

7. The aircraft fuselage according to claim 3, wherein the display device includes a projector located in the cabin and configured for projecting the computed image onto the display surface.

8. The aircraft fuselage according to claim 1, wherein the display device incorporates an image distortion correction system configured to adapt the computed image to a topography of the display surface.

9. The aircraft fuselage according claim 1, wherein the image acquiring device includes at least one video camera.

10. The aircraft fuselage according to claim 1, wherein the image acquiring device includes at least one video camera disposed on a lateral part of the fuselage.

11. The aircraft fuselage according to claim 1, wherein the image acquiring device includes at least two video cameras respectively disposed one on an upper part of the fuselage and the other on a lower part of the fuselage.

12. The aircraft fuselage according to claim 1, wherein the image acquiring device includes a set of video cameras configured to acquire the image of the outside environment corresponding to a field of view that is not viewable to the passenger due to a wall of the cabin.

13. An aircraft fuselage of an aircraft, comprising:
   at least one cabin, configured to accommodate at least one passenger, and including at least one window,
   a system associated with the window for displaying an image of an outside environment of the aircraft, comprising:
   at least one video camera for acquiring the image of the outside environment of the aircraft;
   at least one display surface;
   a video projector arranged to display the image on the display surface; and
   a first image processor connected to the at least one video camera to receive the image of the outside environment;
   the first image processor having appropriate electrical circuitry and computer-executable instructions to:

produce a computed image which is in continuity with the image of the outside environment visible to the passenger through the window, and transmit the computed image to the video projector; and a second image processor configured for determining a position of a head of the passenger and a direction of a gaze of the passenger, wherein the second image processor transmits values of the position of the head of the passenger and the direction of the gaze of the passenger to the first image processor, such that the computed image is generated based on the position of the head and the direction of the gaze of the passenger, and wherein the system is operated in two different modes, a first mode in which the determination of the position of the head of the passenger and the direction of the gaze of the passenger is activated during at least one of a takeoff phase and a landing phase of the aircraft, and a second mode in which the determination of the position of the head of the passenger and the direction of the gaze of the passenger is deactivated during a cruising phase of the aircraft.

\* \* \* \* \*